United States Patent [19]

Kronenberg et al.

[11] Patent Number: 4,631,414
[45] Date of Patent: Dec. 23, 1986

[54] RADIOLOGICAL INSTRUMENT

[75] Inventors: Stanley Kronenberg, Skillman, N.J.; William L. McLaughlin, Washington, D.C.; Carl R. Seibentritt, Jr., McLean, Va.

[73] Assignee: The United States of America as represented by the Secretary of the Army, Washington, D.C.

[21] Appl. No.: 778,120

[22] Filed: Sep. 20, 1985

[51] Int. Cl.$^4$ .............................................. G01T 1/02
[52] U.S. Cl. ............................. 250/474.1; 250/472.1; 356/136
[58] Field of Search .......................... 250/474.1, 472.1; 356/136

[56] References Cited

U.S. PATENT DOCUMENTS 4,377,751 3/1983 Kronenberg et al. ........... 250/474.1

OTHER PUBLICATIONS

"Broad Range Dosimetry Width Leuko-Dye Optical Waveguides", S. Kronenberg, et al., *Nuclear Instruments and Methods*, vol. 190, No. 2, Dec. 1, 1981.
"Opto-Chromic Dosimetry System for Irradiation Process of Food", C. K. Humphreys, et al., *Fourth International Conference of Radiation Processing*, Dubrovnik, Yugoslavia, Oct. 4–8, 1982.
"Radiochromic Waveguides for Gamma and Fast Neutron Dosimetry", S. Kronenberg, et al., *Proceedings NATO Working Group Meeting on the Assessment of Injury from Ionizing Radiation in Warfare*, A.F.F.R.I., pp. 523–544, Oct. 18–22, 1982.

*Primary Examiner*—Bruce C. Anderson
*Assistant Examiner*—Jack I. Berman
*Attorney, Agent, or Firm*—Sheldon Kanars; Jeremiah G. Murray; John T. Rehberg

[57] ABSTRACT

A radiological measuring instrument including an angularly variable radiation sensitive structure comprised of two blocks of material having a different index of refraction with one of the materials comprising a radiochromic substance whose refractive index changes through anomolous dispersion as a result of being exposed to radiation. The ratio of the two indices of refraction is selected to be close to unity, with the radiation sensitive structure being pivotally adjusted so that light is directed into one end of the block comprising a material having the greater index of refraction. This element, moreover, is selected to be clear and transparent with the incident angle being close to the critical angle where total reflection of all incident light occurs. A portion of the incident light is furthermore projected through the clear transparent block without reflection, with the two beams emerging from the other end of the block, where they are detected. Exposure to radiation changes the index of refraction of the radiochromic block and accordingly the reflected energy emerging therefrom. Calibrated readjustment of the angle of incidence provides a measure of the sensed radiation.

19 Claims, 7 Drawing Figures

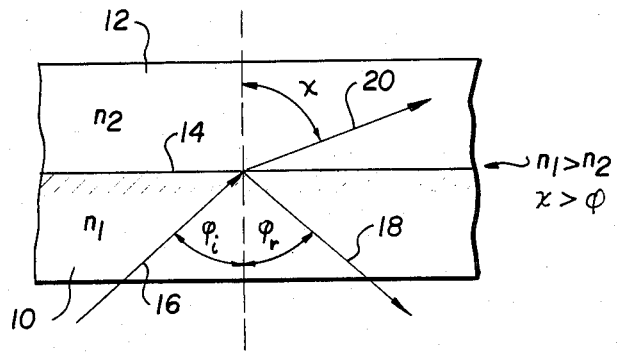
FIG.1
FIG.6
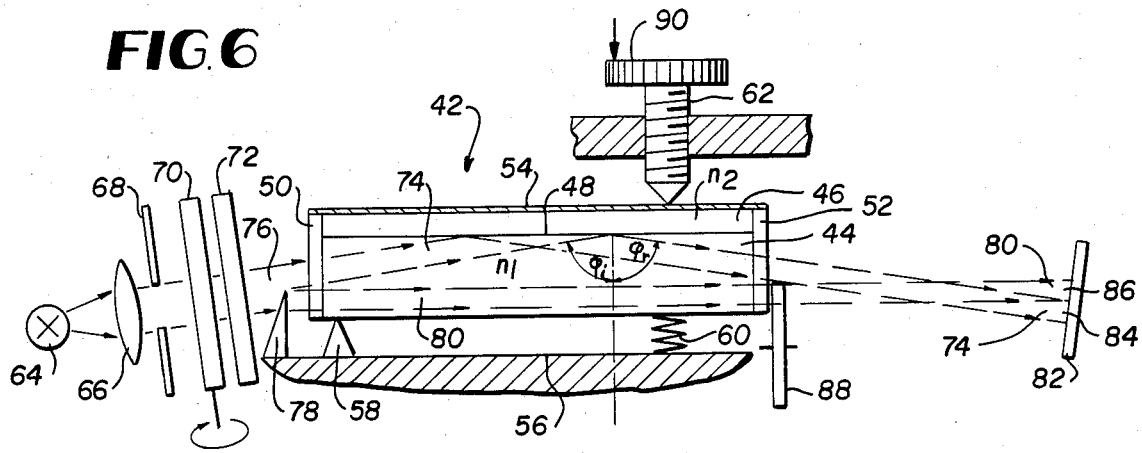
FIG.7
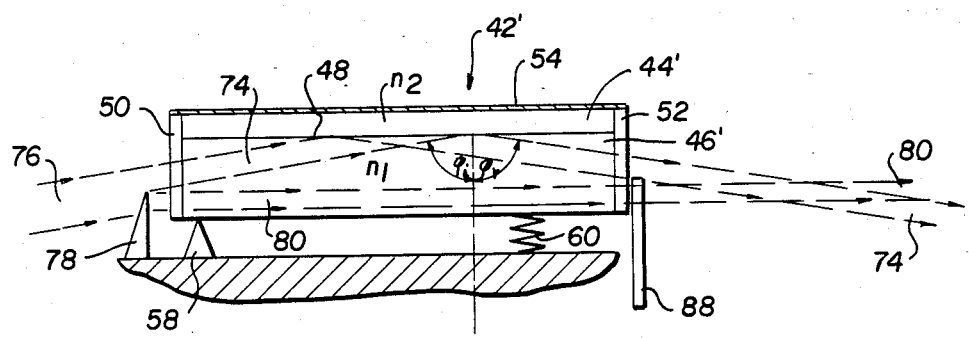

RADIOLOGICAL INSTRUMENT

The invention described herein may be manufactured and used by or for the Government for governmental purposes without the payment of any royalties thereon or therefor.

BACKGROUND OF THE INVENTION

1. Field of the Invention

This invention relates generally to instruments for measuring radiation and more particularly to such instruments which operate in accordance with changes in the refractive index of radiochromic materials as a result of anomolous dispersion upon being exposed to nuclear radiation.

2. Description of the Prior Art

It is well known that the exposure of radiochromic material to nuclear radiation, for example, generates an absorption band for visible light. This causes changes in the refractive index of the radiochromic substance through anomolous dispersion. This effect has been utilized heretofore in the design of radiation dosimetry systems. An example of such apparatus is disclosed, for example, in U.S. Pat. No. 4,377,751, entitled, "Optical Waveguide Dosimeter", which was issued to Stanley Kronenberg, et al. on Mar. 22, 1983. Other applications and means for their implementation furthermore have been disclosed in: "Broad Range Dosimetry Width Leuko-Dye Optical Waveguides", S. Kronenberg, et al., *Nuclear Instruments and Methods*, Vol. 190, No. 2, Dec. 1, 1981; "Optical Chromic Dosimetry System For Radiation Process of Food", C. K. Humphreys, et al., *Fourth International Conference Of Radiation Processing*, Dubrovnik, Ugoslavia, Oct. 4–8, 1982; and "Radiochromic Waveguides For Gamma And Fast Neutron Dosimetry", S. Kronenberg, et al., *Proceedings NATO Workinq Group Meetinq On The Assessment Of Injury From Ionizing Radiation In Warfare*, A.F.F.R.I., P. 523–544, Oct. 18–22, 1982.

Accordingly, it is an object of the present invention to provide an improvement in instruments for measuring radiation.

It is a further object of the invention to provide an improved radiological measuring instrument which operates in accordance with changes in the refractive index of radiochromic substances.

It is yet a further object of the invention to provide an improvement in radiological instrumentation including radiochromic substances whose index of refraction changes through anomolous dispersion as a result of exposure to nuclear radiation.

SUMMARY

Briefly, the foregoing and other objects are achieved by apparatus which utilizes the very large variation in the intensity of reflected visible light at the interface of two optical media near the critical angle of incidence where partial reflection changes into total reflection. The apparatus includes a pivoted radiation sensitive structure comprised of two contiguous elongated solid members having a planar interface therebetween and comprised of materials having mutually different indices of refraction. One of the materials comprises a radiochromic substance whose index of refraction is sensitive to radiation. One of the members is furthermore comprised of a clear and transparent material and has a higher index of refraction than the other, with the ratio of the two indices of refraction being very nearly equal to unity. Light from an external source is projected into the clear and transparent member having the greater index of refraction at an angle close to the critical angle where partial reflection of incident light changes into total reflection. A prism projects a portion of the incident light directly through the transparent member without reflection, whereupon the two emerging beams from the transparent member are displayed side by side on an optical target for intensity comparison. Equal intensities are initially established by varying the pivoted angle of the structure by means of a manually adjustable screw type element in contact with the two solid members. Upon being exposed to radiation, the index of refraction of the radiochromic material changes and accordingly the light reflected from the planar interface. A radiation measurement is accomplished, for example, by observing the angle of rotation required to reestablish emerging light beams of equal intensity.

BRIEF DESCRIPTION OF THE DRAWINGS

FIG. 1 is a diagram illustrative of the effect of light reflection and refraction at the interface between media having different indices of refraction.

FIG. 6 is a mechanical schematic diagram illustrative of one embodiment of the subject invention; and FIG. 7 is a partial mechanical schematic diagram illustrative of a second embodiment of the subject invention.

DESCRIPTION OF THE PREFERRED EMBODIMENTS

Figure 2:
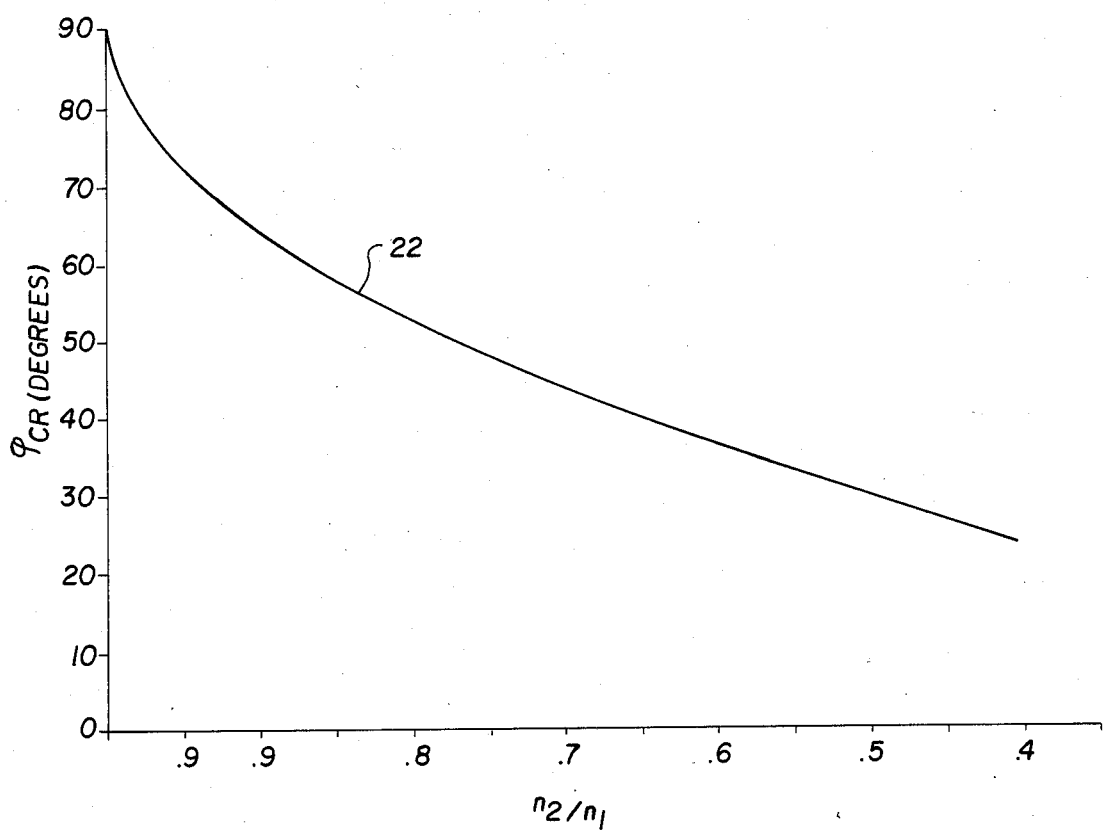
FIGS. 2 through 4 are a set of curves further illustrative of the characteristic of light at the interface between materials having different indices of refraction.

Before considering the preferred embodiments of the invention, reference will be made first to the diagram of FIG. 1 which is intended to provide an explanation of the principle of operation upon which the invention is based. Referring now to FIG. 1, reference numerals 10 and 12 are intended to designate two optical media which have a planar interface 14. The two media 10 and 12, furthermore, have respective refractive indices $n_1$ and $n_2$, where $n_1 > n_2$. A parallel beam of incident light 16 entering the interface 14 from the medium 10 of greater refractive index $n_1$ and, being at a relatively small angle of incidence $\phi_i$, will be partially reflected at an equal angle $\phi_r$ and partially refracted into the adjacent medium 12 at an angle x, with x being greater than angle $\phi_i$. As the angle $\phi_i$ increases, the angle x likewise increases until a critical angle $\phi_{cr}$ is reached, at which point all light is totally reflected.

The critical angle $\phi_{cr}$ is defined by the expression:

$$\frac{n_2}{n_1} = \sin \phi_{cr} \qquad (1)$$

This variation, moreover, is graphically demonstrated by the curve shown by reference numeral 22 of FIG. 2. As shown, the critical angle $\phi_{cr}$ increases non-linearly to 90° as the ratio $n_2/n_1$ approaches 1. The change of the critical angle with respect to the change of the ratio of the indices of refraction can furthermore be expressed by the equation:

$$\frac{d\phi_{cr}}{d\left(\frac{n_2}{n_1}\right)} = \frac{1}{\sqrt{1-\left(\frac{n_2}{n_1}\right)^2}} \quad (2)$$

Figure 3:
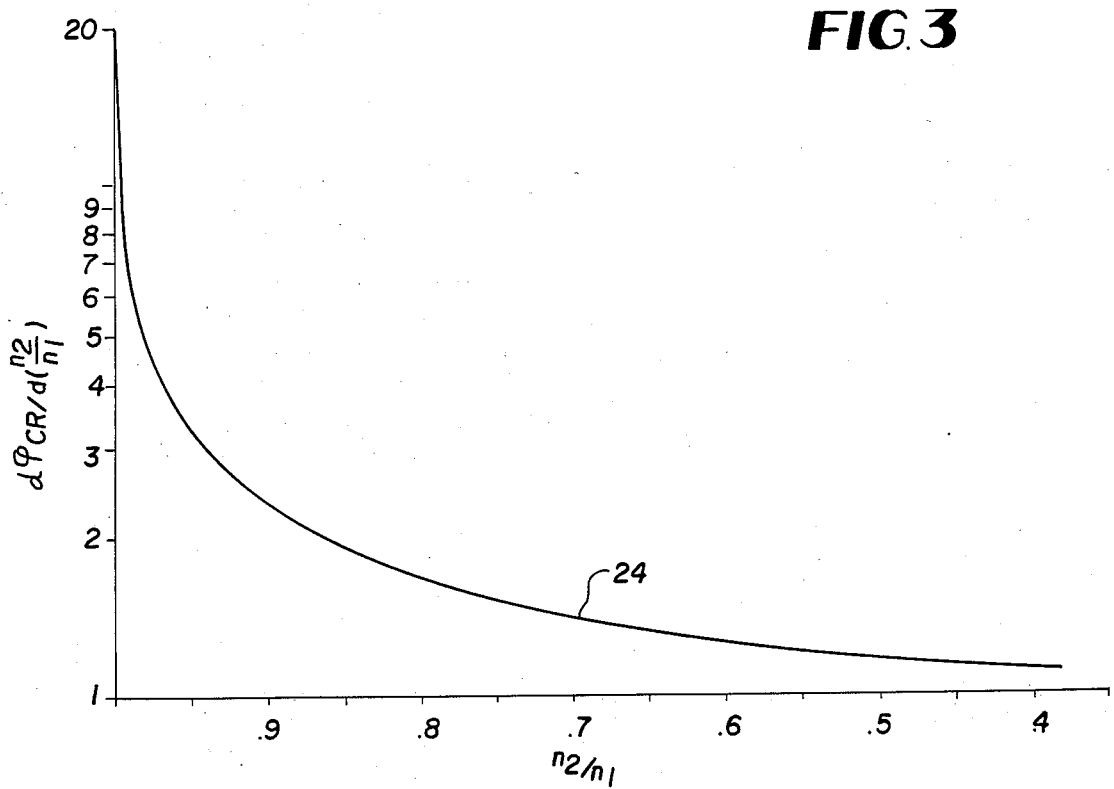

This function is graphically demonstrated by the curve 24 of FIG. 3. It can be seen that as the ratio of $n_2/n_1$ approaches unity, the function increases very steeply and goes assymptotically towards infinity.

Figure 4:
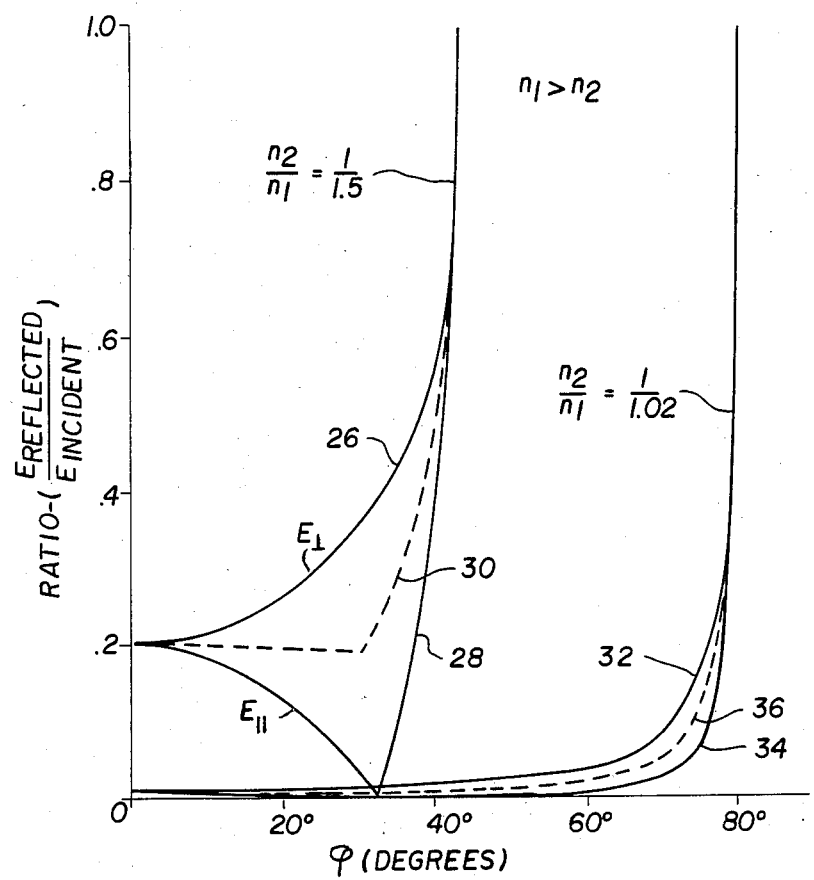

Referring now to FIG. 4, there is shown the relationship between the angle $\phi_i$ and the ratio of reflected to incident electric field vectors of a polarized and non-polarized light beam for two different ratios of refractive indices. For the ratio $n_2/n_1=1/1.5$, reference numeral 26 is illustrative of the characteristic curve for incident light which is perpendicularly polarized while reference numeral 28 is illustrative of the characteristic curve for incident light which is parallely polarized. The dashed line of reference numeral 30 is indicative of non-polarized light. In either case, it is seen that the critical angle $\phi_{cr}$ is between 40° and 50°. On the other hand, where the ratio of $n_2/n_1=1/1.02$, the critical angle $\phi_{cr}$ is nearly 80° with the curves 32, 34 and 36 being illustrative of perpendicularly polarized, parallel polarized and non-polarized incident light, respectively.

Thus as the angle $\phi_i$ approaches the critical angle $\phi_{cr}$, the ratio of reflected to incident light rises very steeply and rises faster for parallel polarized light than for light polarized perpendicularly. Moreover, the ratio of respective intensity (absolute values of the Poynting vector) is the square of the ratio of the E vectors and thus rises even much steeper than the corresponding characteristic curves of FIG. 4.

Figure 5:
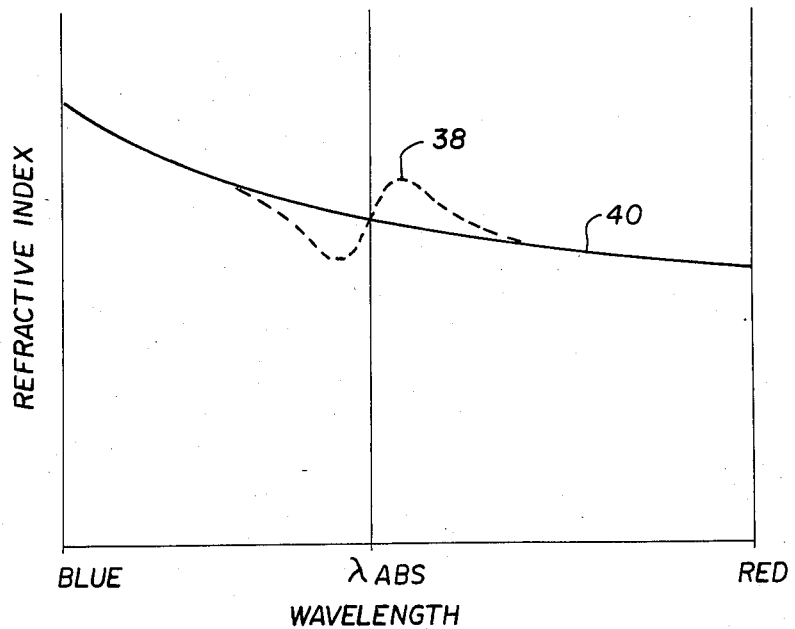
FIG. 5 is a characteristic curve illustrative of the change of refractive index of radiochromic material resulting from the anomolous dispersion effect when exposed to radiation.

The present invention is directed to the utilization of the physical principle described with reference to FIGS. 1 through 4 where large variations in the intensity of reflected visible light at the interface of two optical media near the critical angle of incidence and where the partial reflection changes into total reflection. Furthermore, if one of these two media is comprised of radiochromic material, slight changes in its index of refraction as a result of being exposed to nuclear radiation can produce very large changes in the intensity of the reflected light beam. Such a change of refractive index is shown, for example, by the dashed line 38 in FIG. 5 when exposure to nuclear radiation generates an absorption band for visible light. This change in the refractive index, as is well known, occurs as a result of anomolous dispersion. Accordingly, slight changes in the index of refraction can produce very large changes in the intensity of a reflected light beam, thus serving as an amplifier with a relatively large amplification factor. This effect is particularly pronounced where the ratio of two indices of refraction approaches unity, but at least greater than 0.95, and thus the critical angle is close to 90°.

Considering now the first embodiment of the invention, attention is directed to FIG. 6 where reference numeral 42 denotes a radiation sensitive structure comprised of a solid clear and transparent block 44 of radiochromic material and having a refractive index $n_1$. The radiochromic block 44 is contiguous with a relatively smaller block 46 of non-radiochromic material and having a refractive index of $n_2$. Moreover, $n_1 > n_2$. The non-radiochromic block 46 is coextensive with the radiochromic block 44 and share a common inner surface of interface 48. The ends of the two blocks 44 and 46 are terminated by respective light filters 50 and 52 which may be, for example, ultra-violet filters. The outer surface of the upper non-radiochromic block 46 is covered by a light absorptive material 54 so as to receive the radiation to be measured. The structure 42 is pivotally mounted on a base shown schematically by reference numeral 56 by a fulcrum element 58 located toward one end and a compression spring member 60 located toward the other end and which contact the outer surface of the lower surface of the lower i.e. radiochromic block 44. Opposing the compression spring 60 is a means 62 for varying the longitudinal angle of elevation and which comprises a manual adjustment screw in contact with the material 54 of the upper i.e. non-radiochromic block 46.

Further as shown in FIG. 6, visible light from a light source 64 is converted by means of a lens 66 into an approximately parallel light beam 74 which comprises part of an input beam 76 and which is directed at an angle $\phi$ into the end of the structure including the filter 50. The angle $\phi$ is made to be at least 80° by adjustment of the screw 62. The input beam of light 76, however, first passes through a diaphragm or iris 68, a rotatable light polarizer 70 and a relatively narrow bandpass color filter 72. Another portion of the input beam 76 entering the structure 42 is intercepted by a prism 78 forming thereby a secondary beam 80 which traverses through the length of the transparent block 44 unreflected. Both beams 74 and 80 exit the other end of the block 44 at the filter 52 and impinge on a target 82 at 84 and 86. The target 82 may consist of a flat glass plate. The non-reflected beam 80, moreover, passes through a variable neutral density filter 88 before impinging on the target 82. When desirable, the two emerging beams 74 and 80 may be directed to and detected by two independent light meters, not shown, where their intensities can be independently measured.

In operation, the variable polarizer 70 and variable neutral density filter 88 are utilized for establishing an initial or zero setting to equalize the intensities of the two emerging beams 74 and 80 at the target 82 prior to irradiation. This can also be enhanced by changing the frequency band of the incident beam by tilting the interference color filter 72. Thus when the device is exposed to nuclear radiation which changes the index of refraction of the radiochromic block 44, a readout of the absorbed radiation is achieved by observing the angle of rotation needed to again make the intensity of the two emerging light beams equal. This is provided, for example, by calibrated indices, not shown, included on the flat head 90 of the screw 62.

A second embodiment of the invention is shown in FIG. 7 and is in all respects like the embodiment shown in FIG. 6 with the exception that the position of the block 44 of radiochromic material and the block 46 of non-radiochromic material are interchanged. Accordingly, as shown in FIG. 7, a radiation sensitive structure 42' is configured such that the upper and relatively thinner block is comprised of radiochromic material. This is shown by reference numeral 44'. The larger block as shown by reference numeral 46' is comprised of non-active clear, transparent optical material; however, the refractive index of the non-radiochromic or non-active material of the block 46' now has the refractive index of $n_1$ which is greater than the refractive index $n_2$ of the radiochromic block 44'.

Since the input light beam 76 is still applied through the lower transparent block 46', it must have a refractive index greater than that of the upper block 44' ($n_1 > n_2$) in order to obtain total reflection at the interface 48. In this second embodiment, the measurement of radiation depends only on the induced anomalous dispersion in the upper body member 44' which is contiguous with the light absorbing surface 54 and is not in any way affected by an intermediate body as in the case for the embodiment of FIG. 6. Even then a slight effect of the absorption band generated in the radiochromic medium 44' may be apparent due to the energy loss in the evanescent wave which propagates vertically to the interface plane into the non-radiochromic medium 46'.

In the embodiment shown in FIG. 6, the radiochromic medium 44 through which the light beams 74 and 80 pass require that it have relatively good optical qualities.

With respect to materials utilized, the solid, clear transparent radiochromic block 44 of FIG. 6 can be formed by a solution of hexamethyl ethyl pararosaniline cyanide in a solid polymethyl methacrylate matrix which is also known by the name "LUCITE", a registered trademark, while the non-radiochromic block 46 can be configured from any inert medium; however, polymethyl methacrylate is also a suitable material.

Insofar as the embodiment shown in FIG. 7 is concerned, the upper radiochromic block 44' can be comprised of, for example, nylon impregnated with hexamethyl pararosaniline cyanide while the clear transparent non-radiochromic block 46' is comprised of polymethyl methacrylate. Also, when desired, a clear solid of tetrafluoroethylene known as "TEFLON", a registered trademark, can be used as the non-active medium. In each instance, the two materials can easily be fused together to form an integral block having a well defined planar interface.

In an application where a dosimeter is required, the radiochromic material should furthermore be designed to have a non-fading affect in response to radiation and can be achieved by making the PH of the material less than 7. On the other hand, where a dose rate meter is required, the radiochromic material should have a relatively quick fading response which can be obtained by making the PH greater than 7. Thus the fading time constant defines a response time of the dose rate meter. Fixed ambient radiation dose rate builds the affect up while fading builds it down. An equilibrium value of index of refraction is thus achieved which depends only on the ambient dose rate.

The operational range and thus the sensitivity of the instrument can be regulated by changing the divergence of the incident light beam. A parallel beam results in the highest sensitivity and resolution however. The operational range can also be widened by shifting the wavelength band of the readout light from regions where the anomalous dispersion effect peaks as shown by the portion 38 of the characteristic curve 40 of FIG. 5. Also by using a mixture of solvents of radiochromic material one can achieve exact matching of the average atomic number of the radiochromic solution with the atomic number of a spedified tissue, e.g. muscle, bone or average tissue, whereby a correct tissue equivalent energy dependence can be achieved. Being hydrogenous, solutions of radiochromic material will additionally measure fast neutrons. The effect is caused by recoil protons and the neutron energy response parallels the scattering cross section in an analogous manner to the effect of neutrons on tissue.

For most military uses, a powered light source would be required; however, instruments utilized for civil defense, for example, could be constructed obviating the need for any power source with ambient light being used as the light source. Readout can be accomplished by equalizing the intensities on a flat plate such as a piece of ground glass which is used as the target shown in FIG. 6; however, where two light detectors, not shown, are utilized to intercept the emerging beams 74 and 80, an internal battery is required to power the electronic circuitry associated therewith and for powering a possible digital readout meter.

The invention, moreover, is capable of reading a small dose on top of a large dose because for any index of refraction of the radiochromic material utilized, there is an exactly defined critical angle irrespective of the previous radiation history of the instrument. Peak sensitivity can thus be achieved until a total dose is achieved where the absorption band grows relatively high and wide and the anomolous dispersion starts to saturate. This, however, happens at very high doses which are outside the range of military or civil defense applications.

Thus what has been shown and described is a radiation instrument which is applicable both for use as a dosimeter and dose rate meter with a very high dynamic range. The instrument furthermore is compact and requires little or no power for its operation. A dosimeter can be provided which has a zeroing capability without need for auxiliary equipment. Furthermore, excellent energy dependence for measuring tissue equivalent doses and dose rates can be provided with the added capability of measuring both the gamma dose and neutron dose in tissue rads. Since dose readout independent of dose rate can be provided, there is a capability of measuring P.I.R. (prompt initial radiation).

Having thus shown and described what is at present considered to be the preferred embodiments of the invention, it should be noted that the same has been made by way of illustration and not limitation. Accordingly, all modifications, alterations and changes coming within the spirit and scope of the invention as defined in the appended claims are meant to be included.

We claim:

1. An instrument for measuring radiation, particularly nuclear radiation, comprising:

a radiation sensitive structure pivoted toward one end and including a pair of elongated solid members contiguously joined together along their length dimensions and having a common planar interface therebetween, one of said pair of members being comprised of radiochromic material whose index of refraction changes due to anomalous dispersion as a result of being exposed to nuclear radiation, said pair of members further having mutually different indices of refraction with the member having the larger index of refraction further being transparent for the passage of light and of energy therethrough;

means located toward the other end of said structure for varying the angle of longitudinal elevation of said pair of members;

means for generating and projecting a beam of light into one end of said member having the larger index of refraction, said beam of light being projected toward said planar interface where it is reflected out of the other end of said same said member as a first output beam;

means projecting a portion of said beam of light into said one end of said member having the larger index of refraction where it traverses therethrough without reflection and out of the other end of said same said member as a second output beam; and means adjacent said structure for receiving said first and second output beams, whereby a calibrated change in the angle of elevation of said structure between positions of equal intensity of said first and second output beams prior to and following exposure provides a measure of the radiation sensed due to a change of refraction of said radiochromic material.

2. The instrument as defined by claim 1 wherein the ratio of the smaller index of refraction to the larger index of refraction is very nearly equal to unity.

3. The instrument as defined by claim 2 wherein said member including radiochromic material comprises said member having the larger index of refraction.

4. The instrument as defined by claim 2 wherein said member including radiochromic material comprises the member having the smaller index of refraction.

5. The instrument as defined by claim 1 wherein said pair of members are comprised of substantially equal length solids and additionally including a layer of radiation absorptive material for exposure to said radiation to be sensed located on the outer surface of said member having the lower index of refraction.

6. The instrument as defined by claim 5 wherein said substantially transparent member having the larger index of refraction has a greater thickness than said member having the lower index of refraction, where said larger index of refraction is $n_1$ and said lower index of refraction is $n_2$, and where $n_2/n_1 \rightarrow 1$.

7. The instrument as defined by claim 6 wherein said member having the larger index of refraction comprises said member including radiochromic material and wherein said member having the lower index of refraction comprises a member fabricated of non-radiochromic material.

8. The instrument as defined by claim 6 wherein said member having the larger index of refraction is comprised of non-radiochromic material and wherein said member having the lower index of refraction is comprised of said member including radiochromic material.

9. The instrument as defined by claim 5 and additionally including light filter means located at each end of said radiation sensitive structure.

10. The instrument as defined by claim 5 wherein said means for generating and projecting the beam of light into one end of said member having the larger index of refraction comprises a light source, means adjacent to the light source for converting the energy emanated from said light source into a parallel light beam, and means for restricting said light beam to a predetermined beam size.

11. The instrument as defined by claim 10 wherein said means for converting said light energy into a beam comprises a lens and wherein said means for restricting said beam size comprises a diaphragm.

12. The instrument as defined by claim 10 and additionally including bandpass color filter means located intermediate said means for restricting beam size and said one end of said member having the larger index of refraction into which said beam is projected.

13. The instrument as defined by claim 12 and additionally including variable neutral density filter means located in the path of said second output beam.

14. The instrument as defined by claim 13 and additionally including ultraviolet light filter means at each end of said member having the larger index of refraction.

15. The instrument as defined by claim 1 wherein said means for projecting a portion of said beam of light into one end of said member where it traverses therethrough without reflection comprises a prism.

16. The instrument as defined by claim 1 wherein said means for receiving said first and second output beams comprises a substantially flat plate member for displaying said output beams.

17. The instrument as defined by claim 1 wherein said means for receiving said first and second output beams comprises light detecting means.

18. The instrument as defined by claim 17 wherein said light detecting means comprises first and second light detectors for providing separate light detection of said output beams.

19. The instrument as defined by claim 1 wherein said means for varying the angle of elevation of said pair of members comprises a compression spring member biased against one outer surface of said pair of members and a manually tunable screw member in contact with an opposing outer surface, whereby the turning of said screw/member raises or lowers the angle of tilt longitudinal elevation and accordingly varies the angle of incidence of said light beam into said one end of said member having the larger index of refraction.

* * * * *